United States Patent [19]
Nakano

[11] Patent Number: 5,818,608
[45] Date of Patent: *Oct. 6, 1998

[54] QUICK RESPONSE FACSIMILE APPARATUS

[75] Inventor: Yoshio Nakano, Takatsuki, Japan

[73] Assignee: Matsushita Electric Industrial Co., Ltd., Kadoma, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 499,209

[22] Filed: Jul. 7, 1995

Related U.S. Application Data

[63] Continuation of Ser. No. 47,697, Apr. 14, 1993, abandoned.

[30] Foreign Application Priority Data

Apr. 15, 1992 [JP] Japan ................................. 4-095218

[51] Int. Cl.⁶ ............................................................. H04N 1/32
[52] U.S. Cl. ......................... 358/434; 358/435; 358/439
[58] Field of Search ................................. 358/400, 403, 358/405, 434, 435, 436, 439, 440, 404, 444, 468; 379/100, 100.07; 383/317; 434/353–364; 382/187; H04N 1/32

[56] References Cited

U.S. PATENT DOCUMENTS

| | | | |
|---|---|---|---|
| 3,588,335 | 6/1971 | Harris et al. ............................. | 178/6.6 |
| 3,896,266 | 7/1975 | Waterbury .................................. | 179/1 |
| 4,113,993 | 9/1978 | Heckman ................................. | 358/440 |
| 4,432,020 | 2/1984 | Onose et al. ............................. | 358/257 |
| 4,566,127 | 1/1986 | Sekiya et al. ............................ | 383/217 |
| 4,586,086 | 4/1986 | Ohzeki ..................................... | 358/256 |
| 4,672,662 | 6/1987 | Nishino et al. ......................... | 379/277 |
| 4,752,808 | 6/1988 | Lemelson ............................. | 355/14 R |
| 4,825,461 | 4/1989 | Kurita et al. ............................ | 379/100 |
| 4,847,891 | 7/1989 | Kotani ..................................... | 379/100 |
| 4,876,606 | 10/1989 | Banno et al. ........................... | 358/434 |
| 4,893,333 | 1/1990 | Baran et al. ............................. | 379/100 |
| 4,918,722 | 4/1990 | Duehren et al. ........................ | 379/100 |
| 4,956,860 | 9/1990 | Murata .................................... | 379/100 |
| 4,974,254 | 11/1990 | Perine et al. ............................ | 358/435 |
| 4,994,926 | 2/1991 | Gordon et al. .......................... | 358/400 |
| 5,036,535 | 7/1991 | Gechter et al. ......................... | 379/100 |
| 5,075,783 | 12/1991 | Yoshida et al. ........................ | 358/434 |
| 5,084,769 | 1/1992 | Miura ...................................... | 358/403 |
| 5,101,428 | 3/1992 | Koue ....................................... | 379/100 |
| 5,127,047 | 6/1992 | Bell et al. ................................ | 379/100 |
| 5,128,735 | 7/1992 | Ohmi et al. . | |
| 5,155,602 | 10/1992 | Terajima ................................. | 358/440 |
| 5,267,303 | 11/1993 | Johnson et al. ......................... | 358/436 |
| 5,377,017 | 12/1994 | Lam ........................................ | 358/405 |
| 5,452,379 | 9/1995 | Poor ........................................ | 434/362 |
| 5,493,421 | 2/1996 | Uetama et al. ......................... | 358/434 |
| 5,597,311 | 1/1997 | Yanigida et al. ....................... | 434/358 |

FOREIGN PATENT DOCUMENTS

| | | |
|---|---|---|
| 58-161467 | 9/1983 | Japan . |
| 63-220664 | 9/1988 | Japan . |
| 6473863 | 3/1989 | Japan . |
| 1106670 | 4/1989 | Japan . |
| 1286566 | 11/1989 | Japan . |
| 1295563 | 11/1989 | Japan . |

*Primary Examiner*—Kim Yen Vu
*Attorney, Agent, or Firm*—Price, Gess & Ubell

[57] ABSTRACT

This invention relates to a facsimile apparatus for implementing an automatic transmission of a meaningful response to a document received from the facsimile apparatus on the other terminal of a communication line. Thereby, the addresser of the document will be notified of the receipt of the document or a receiving condition of the addressee when the transmission of the response is postponed. Further the immediate answer to the document will be received by the addresser of the document.

The facsimile apparatus comprises a mode conversion unit for converting its mode from the reception operation into the transmission operation and vise versa upon completion of the reception and completion of the transmission respectively; therefore the transmission/reception of the document and the response will be conducted at the signal communication.

24 Claims, 18 Drawing Sheets

FIG. 3 (a)

Dir sir:
　We acknowledge the receipt of your △ page document dated on ○／○.

very truly yours,
　　　　　　　　　　Matsushita Co., Ltd.

FIG. 3 (b)

Dir sir:
　We acknowledge the receipt of your 7 page document dated on 3／6.

very truly yours,
　　　　　　　　　　Matsushita Co., Ltd.

FIG. 7

```
        mail  order
        application
        form
          your order No.  3 6 0 1
```

| store use | |
|---|---|
| receipt date | receipt No. |

| customer use | |
|---|---|
| address   tel | |
| name | birthday |

| item No. | quantity | unit price |
|---|---|---|
|  |  |  |
|  |  |  |
|  |  |  |
|  |  |  |
|  |  |  |
| total |  |  |

FIG. 8

(customer's copy)

19△△/△△/△△  JLA-0000

FIG. 9

| mail order application form | |
|---|---|
| your order No. | 3 6 0 1 |

| store use | |
|---|---|
| receipt date | receipt No. |
| | |

| customer use | |
|---|---|
| address   tel | |
| 1006 Kadoma, Kadoma-city, Osaka, Japan | |
| name | birthday |
| Tarou Matsushita | |

| item No. | quantity | unit price |
|---|---|---|
| 818-701 | 1 | 2900 |
| 819-411 | 5 | 750 |
| | | |
| | | |
| | | |
| | | |
| total | | 3650 |

FIG. 10

| mail order application form (customer's copy) ||
|---|---|
| your order No. | 3 6 0 1 |

| store use ||
|---|---|
| receipt date | receipt No. |
| 1992/04/15 | JLA-1237 |

| customer use ||||
|---|---|---|---|
| address | | tel ||
| 1006 Kadoma, Kadoma-city, Osaka, Japan ||||
| name | | birthday ||
| Tarou Matsushita | | | |
| item No. | quantity | unit price ||
| 818-701 | 1 | 2900 ||
| 819-411 | 5 | 750 ||
| | | | |
| | | | |
| | | | |
| | | | |
| total | | 3650 ||

FIG. 14 answer sheet for No. 3

| Ref. No. | 0 1 2 |
|---|---|
| Your No. | 4 6 |

Score

| question No. | Q1 | Q2 | Q3 | Q4 | Q5 |
|---|---|---|---|---|---|
| your answer | 5 | 2 | 3 | 5 | 5 |
| correct answer | 5 | 2 | 3 | 5 | 4 |

| question No. | Q6 | Q7 | Q8 | Q9 | Q10 |
|---|---|---|---|---|---|
| your answer | 2 | 4 | 1 | 1 | 3 |
| correct answer | 2 | 2 | 1 | 4 | 3 |

| question No. | Q11 | Q12 | Q13 | Q14 | Q15 |
|---|---|---|---|---|---|
| your answer | 3 | 4 | 2 | 2 | 2 |
| correct answer | 3 | 4 | 2 | 2 | 3 |

| question No. | Q16 | Q17 | Q18 | Q19 | Q20 |
|---|---|---|---|---|---|
| your answer | 1 | 5 | 4 | 4 | 3 |
| correct answer | 2 | 5 | 4 | 4 | 4 |

FIG. 18 invoice

1992/04/15
ABC Co., Ltd.

sold to

| name |
|---|
| Tarou Matsushita |

| item No. | quantity | unit price |
|---|---|---|
| 818-701 | 1 | 2900 |
| 819-411 | 5 | 750 |
|  |  |  |
|  |  |  |
|  |  |  |
|  |  |  |
| total |  | 3650 |

Upon receiving of the above order from you, we enclose herewith our invoice. Please arrange your payment within two week.

QUICK RESPONSE FACSIMILE APPARATUS

This is a continuation of application Ser. No. 08/047,697, filed on Apr. 14, 1993 now abandoned.

BACKGROUND OF THE INVENTION

(1) Field of the Invention

The present invention relates to a facsimile apparatus which provides an immediate meaningful response to a received message.

(2) Description of the Related Art

Along with spread of the facsimile apparatus, the number of businesses employing the facsimile apparatus as their communication means has been increasing, including the mail order system wherein an application form is sent to/received by the facsimile apparatus.

The conventional facsimile apparatus generally engages in a one-way communication. That is, a communication is completed once a document is received by the facsimile apparatus on the other terminal of the communication line.

There are some problems in the conventional facsimile apparatus. That is, receipt of the document by the addressee cannot be confirmed by the addresser immediately in the oneway communication. That is, another communication is required to notify the addresser of the receipt of the document.

Also some of the documents require immediate responses. However, it is assumed in many cases the addressee is absent during receipt of the document since one of the greatest advantages of the facsimile apparatus is to realize the communication even with absence of the addressee; therefore, immediate response to the document will not be realized.

Accordingly, a facsimile apparatus which automatically sends a message confirmation or a meaningful response to the document has long been desired, the message confirmation notifying the addresser of the safe receipt of the document while the meaningful response including an answer to the received document. Further, the addresser may be notified of the delay of the answer when the addressee is absent or too busy to send it; and hence an effective communication based on the quick response can be implemented. For example, obtainment of the immediate response may be convenient for the user who sends the document by the facsimile apparatus installed in a copy center away from home or the work place.

Japanese Laid-open Patent Application No. 1-295563 discloses a facsimile apparatus whereby image data are transmitted upon its receipt of the document. However, the image data, in this case, only include an error message indicating the unsuccessful transmission; therefore no response will be transmitted once the transmission of the original document succeeds. Such facsimile apparatus cannot notify the addresser of the receipt of the document, nor implement the immediate answer to the document.

According to another facsimile apparatus disclosed in Japanese Laid-Open Patent Application No. 64-73863, the document is returned to the addresser as soon as the addressee receives it so that the addresser of the document is notified of the receipt thereof. However, immediate answer to the received document cannot be obtained thereby.

SUMMARY OF THE INVENTION

Accordingly, a major object of the present invention is to provide a facsimile apparatus which implements the automatic transmission of the message confirmation or an answer to the document transmitted thereto (hereinafter referred to as an original document), so that an addresser of the original document will receive the meaningful response upon the completion of the transmission.

The above object may be fulfilled by the facsimile apparatus constructed to implement an automatic transmission of the response to the received document, comprising a mode conversion unit for automatically transmitting the message confirmation or the answer immediately after receiving the original document, a response generation unit for generating the response based on a template for the response and the original document, and a line hold unit for holding the communication line up to completion of the transmission of the response.

In this construction, the response to the original document is automatically transmitted to the facsimile apparatus on the other terminal of the communication line upon the receipt of the original document with holding the ongoing communication line. That is, on transmitting the document, the addresser will be notified of a success or a failure of the communication as well as a presence or an absence of the addressee, without making another communication. Further the present invention has a great advantage of providing the above effective communication to a large number of users. In other words, the use thereof is not limited to the some specific purpose such as the communication between a small number of companies, or the communication between a store and some regular customers, but provides the effective communication available to a large number of users through the mail order system, the correspondence course of education, and the like.

BRIEF DESCRIPTION OF DRAWINGS

These and other objects, advantages and features of the invention will become apparent from the following description thereof taken in conjunction with the accompanying drawings which illustrate a specific embodiment of the invention. In the drawings:

Fig. 3(a) shows a template for a message confirmation;

FIG. 3(b) shows a response based on the template;

FIG. 7 shows a format of a document to be transmitted by the apparatus in FIG. 6;

FIG. 8 shows a template for a response to the document illustrated in FIG. 7;

FIG. 9 shows a document transmitted by the facsimile apparatus in FIG. 6;

FIG. 10 shows a response to the document in FIG. 9;

FIG. 14 shows a response to the document illustrated in FIG. 13;

FIG. 18 shows a response to the document transmitted by the facsimile apparatus in FIG. 15.

DESCRIPTION OF THE PREFERRED EMBODIMENTS (Embodiment 1)

Figure 1:
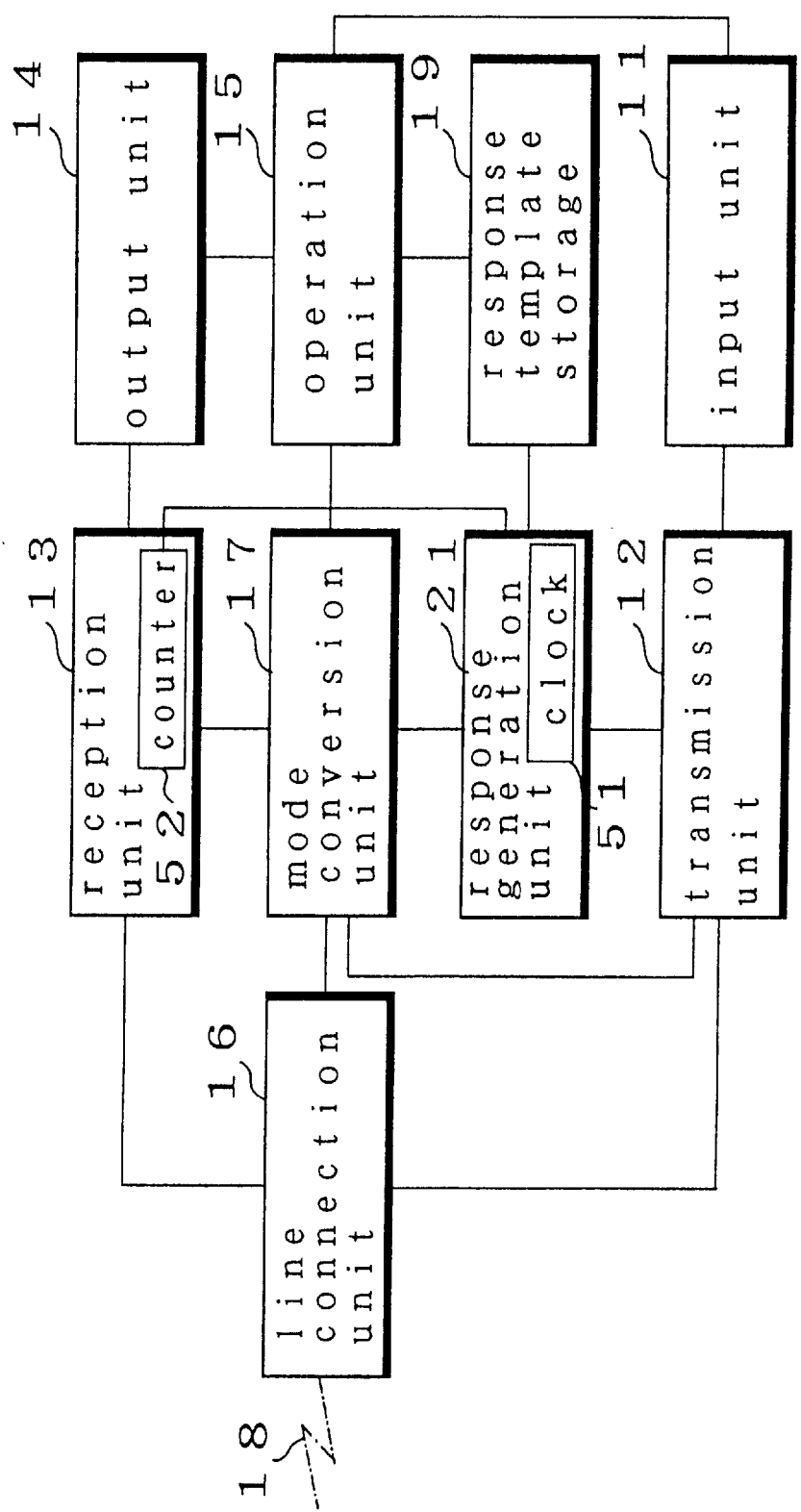
FIG. 1 shows construction of the facsimile apparatus in an embodiment of the present invention.

A first embodiment of the present invention will be described. FIG. 1 shows construction of the facsimile apparatus in this embodiment.

In the figure, an input unit 1 is comprised of a CCD (Charge Coupled Device) for reading image data optically from a document (hereinafter referred to as an original document) as well as a conveyance roller for conveying the original document in a sub-scanning direction.

A transmission unit 12 comprises a ROM (Read Only Memory) for holding the protocol of CCITT (Comite Consultatif International Telephonique et Telegraphique) T.30, a RAM (Random Access Memory) for temporary holding a shortened identification number of the addressee as well as an identification number thereof designed for each communication, and an execution unit for compressing the image data optically read from the original document and transmitting it.

A reception unit 13 comprises a ROM for holding the protocol of the CCITT T.30, a demodulator for expanding the image data and demodulates them into monochrome data, and a counter 52 for counting the page number corresponding to the image data.

An output unit 14 comprises a printer for printing the image data on a paper.

A response template storage 19 electrically stores a template for a response into a magnetic disk or a semiconductor memory chip. Examples of the response are a message confirmation, a response indicating the receiving condition of the addressee, and an answer to the original document.

A response generation unit 21 equipped with a clock 51 generates the response by reading the template in the storage 19 and filling out blanks with the date and the page number with reference to the clock 51 and the counter 52. The template stored in the storage 19 may exclusively comprise a picture or letters; otherwise comprise both a picture and letters.

An operation unit 15 comprising an operation switch and a document input unit is associated with a word processor. The document is inputted by the word processor when the operation switch is turned on.

A line connection unit 16 comprises a line connection control unit for connecting a communication line 18 to the transmission unit 12 as well as to the reception unit 13.

A mode conversion unit 17 terminates the receiving operation based on a signal outputted by the reception unit 13 upon completion of the reception. On terminating the receiving operation, the unit 17 converts its mode into the transmission operation with holding the ongoing communication line.

The response generated by the unit 21 is transmitted to the communication line 18 via the line connection unit 16 upon activation of the unit 17. FIG. 3 shows an example of a template for the response (a). A triangle and circles in the figure will be filled with the number of pages contained in the document and the date of the reception respectively.

Figure 2:
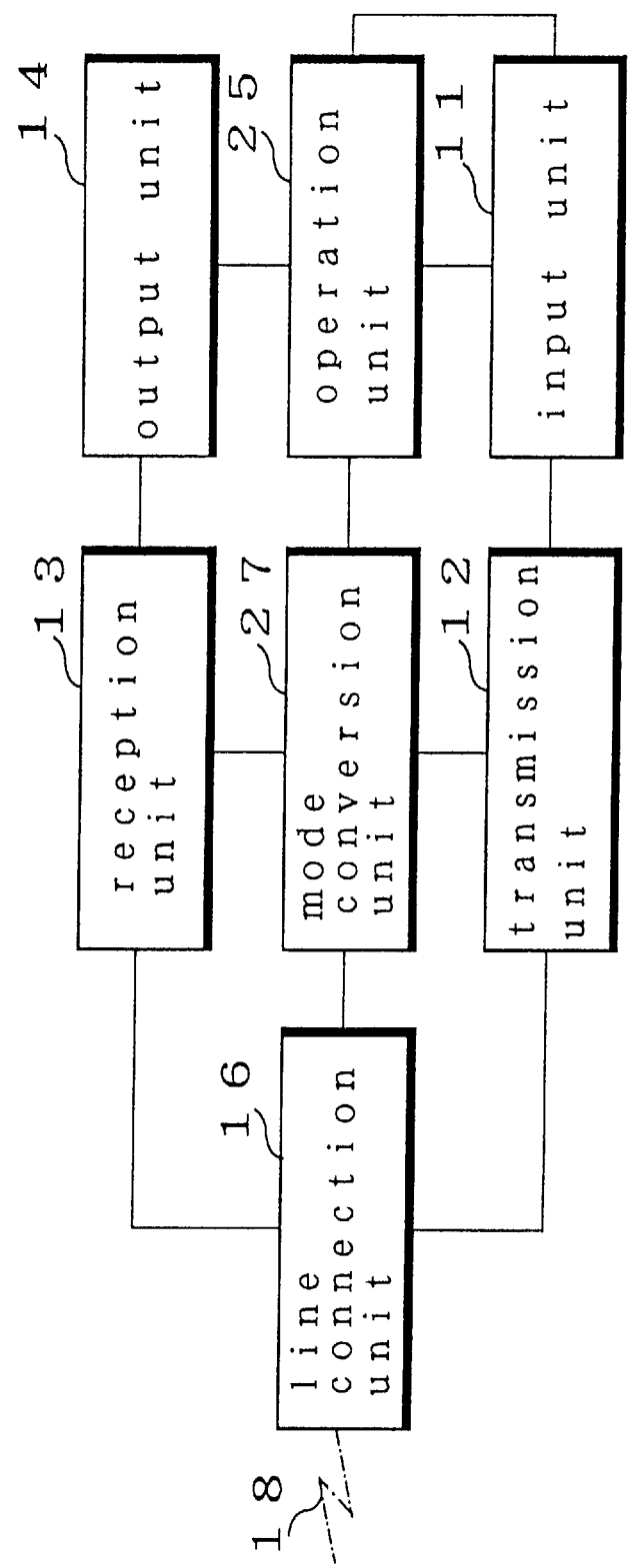
FIG. 2 shows construction of the facsimile apparatus employed by the addressee in the embodiment of the present invention.

FIG. 2 shows construction of the facsimile apparatus for the addresser of the original document, in which like components are labeled with like reference numerals with respect to FIG. 1, and the description of these components is not repeated.

An operation unit 25 comprises an operation panel comprised of a transfer switch besides the called subscriber identification display and the ten key, both of which are well known components of the conventional facsimile apparatuses.

A mode conversion unit 27 terminates the transmission operation based on a signal outputted by the transmission unit 12 upon completion of the transmission. On terminating the transmission operation, the unit 27 converts its mode into the receiving operation with holding the ongoing communication line.

The facsimile apparatus further comprises the character generator, printing papers, the paper feeder, and the memory for storing data transmitted from the facsimile apparatus on the other terminal, all of which are well known.

Figure 4:
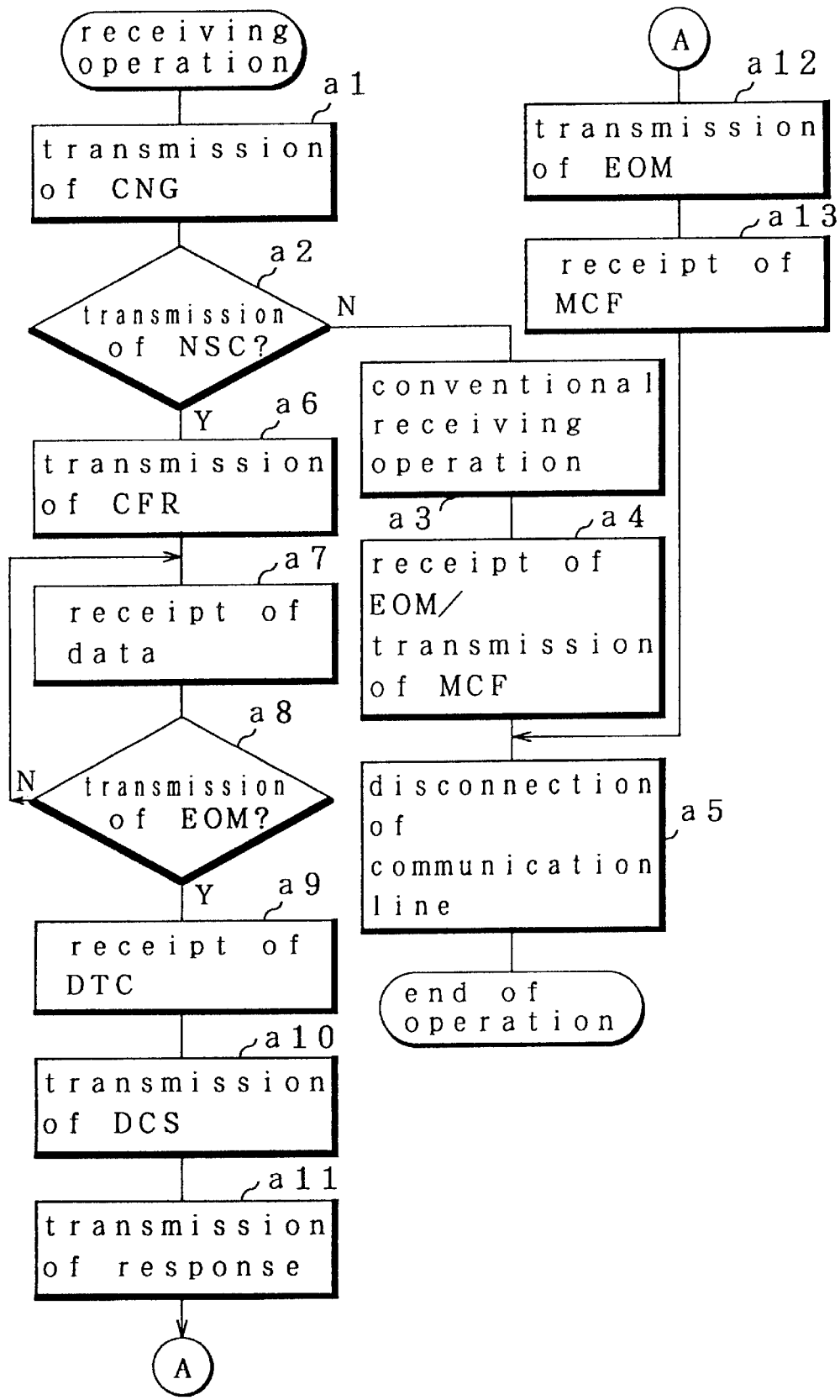
FIG. 4 is a flow chart depicting a receiving operation of the facsimile apparatus in FIG. 1.
Figure 5:
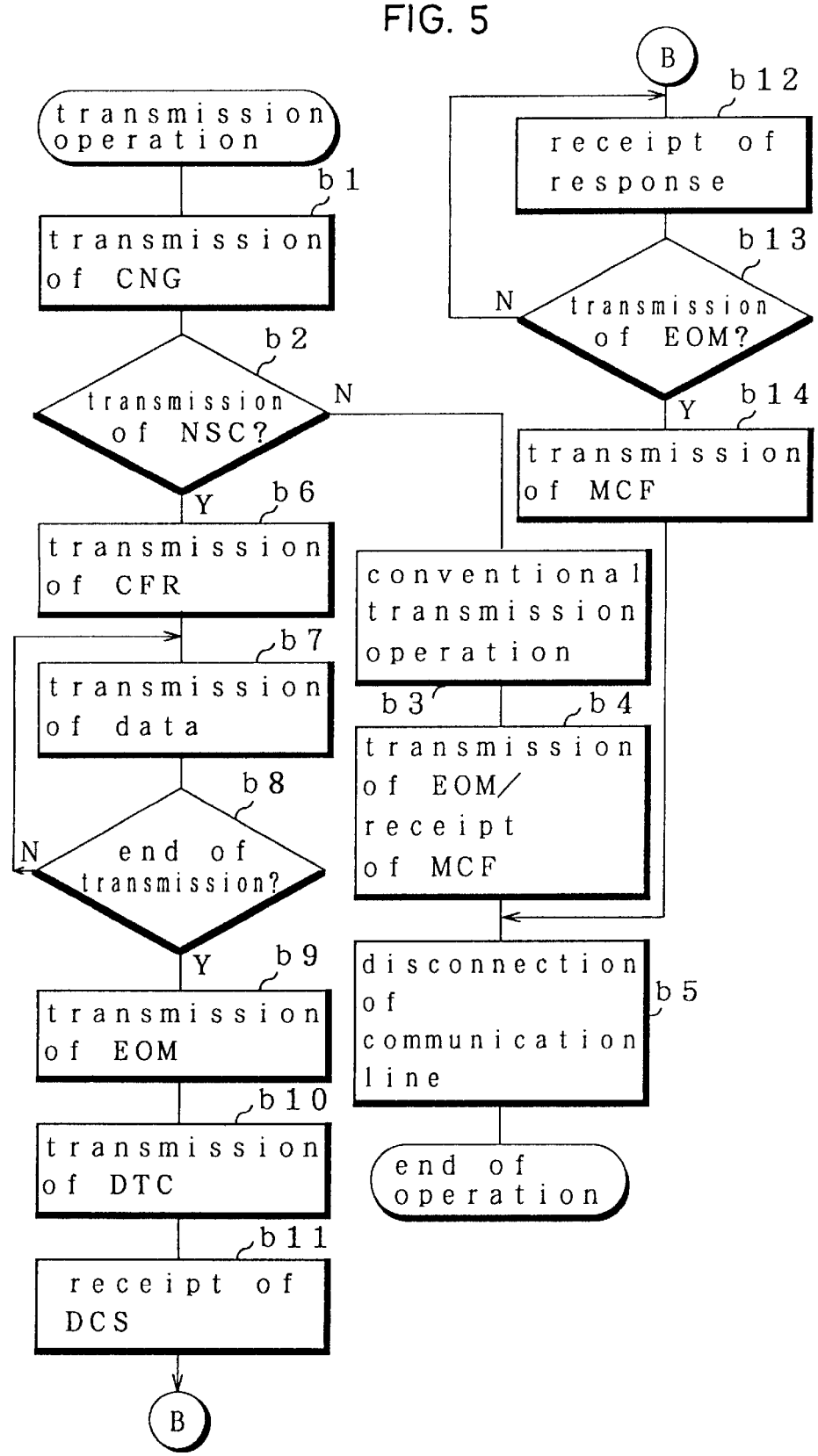
FIG. 5 is a flow chart depicting the transmission operation of the facsimile apparatus in FIG. 1.

The transmission/receiving system of the facsimile apparatuses in FIGS. 1 and 2 will be described referring to FIGS. 4 and 5. Some of the operations are equivalent to the conventional transmission/receiving system.

First, the receiving system will be described.

The facsimile apparatus in FIG. 1 is called by the facsimile apparatus in FIG. 2, the former being the addressee and the latter being the addresser in this case. That is, the addresser sends a Calling tone (CNG) to the addressee. Then, the addressee sends a CSI (Called Subscriber Identification) to the addresser, and the addresser responds to the addressee by sending thereto a CIG (Calling Subscriber Identification). Hence, the addresser and the addressee are connected by a communication line correctly (a1). Receiving a NSF (NonStandard Facilities) from the addressee, the addresser detects that the addressee has another function of data transmission; then responds to the addressee by sending thereto a NSC (NonStandard Facilities Command) (a2). The receiving operation following the transmission of the NSF and the NSC is the same as the conventional facsimile apparatus. That is, the line connection unit 16 connects the reception unit 13 to the communication line 18. The addressee transmits a CFR (Confirmation to Receive) (a6) so that the addresser detects that the reception unit 13 of the addressee can receive data. On receiving the data (a7), the reception unit 13 sends them to the output unit 14.

During the reception of the data, the facsimile apparatus in FIG. 1 executes the same operations as the conventional facsimile apparatus based on the control signals designed by the CCITT. That is, receiving an EOL (End of Line), the facsimile apparatus detects end of each line. Also receiving a MPS (Multiple Page Signal), the counter 52 thereof increases its number by one. Then it detects the end of the reception upon reception of an EOM (End of Message).

The receiving operation after completion of the data reception is different in this embodiment of the present invention from the conventional one. That is, upon detection of completion of the reception based on the EOM, the conventional facsimile apparatus transmits a MCF (Message Confirmation Signal) (a4) so that communication line 18 is disconnected (a5).

On the other hand, according to the present invention, the addresser of the original document can receive the data by transmitting a DTC (Digital Transmit Command). That is, upon completion of the transmission (b8), the addresser transmits the EOM (b9) as well as the DTC so that the addresser can receive the response to the original document (b10). In this case, the communication line remains connected. The receipt of the EOM (a8) and the DTC (a9) by the addressee is posted from the reception unit 13 to the mode conversion unit 17. Then, mode conversion unit 17 converts the mode of the addressee into the transmission operation and directs the response generation unit 21 to generate the response based on the template stored in the response template storage 19. The transmission unit 12 thereof is also directed to transmit a DCS (Digital Command Signal) to the addresser (a10). Once the response is generated, the unit 17 directs transmission of the response. Directed by the unit 17, the communication line unit 16 connects the transmission unit 12 to the communication line as well as disconnects the reception unit 12 therefrom. Now the transmission of the response from the addressee of the original document to the addresser thereof can be conducted (a11), which is substantially same as the transmission of any document by the conventional facsimile apparatus.

FIG. 3 also shows an example of the response (b). The message of the template has been inputted by the word processor associated with the facsimile apparatus; and the date, time, and the page number represented by the circles and the triangle in the (a) are filled referring to the clock 51 and the counter 52 accommodated inside the apparatus. The message in the figure can be replaced with others, such as the response informing the absence of the communication partner by telling "our office has been closed for annual summer vacation until August 17. We hope this will not put you to any inconvenience." Some programs for messages are generated by the operator and are stored in the ROM beforehand, so that the program is selected therefrom in accordance with the message, the selection of which will be described in detail later.

Upon completion of the transmission of the response, the EOM is transmitted (a 12). Then, the communication line is disconnected so that the transmission/receiving operation on both of the terminals is terminated (a5, a13, b13, b14).

Generally, the response includes only the message confirmation in (b) of FIG. 3. However, the message confirmation can be followed by another message if a switch designed for the second transmission of the message is turned on beforehand. For example, the above message informing the absence of the communication partner will be transmitted after the message confirmation.

A transmission system in this embodiment will be described hereinafter. The transfer of the signals is substantially same as in the receiving system and will not be repeated.

The original document is sent to the input unit 11 of the addresser. When the operation switch of the operation unit 15 is turned on, the input unit 11 starts reading image data from the document, and stores the data into the transmission unit 12. The line connection unit 16 connects the transmission unit 12 to the communication line 18 so that the data are transmitted to the communication partner designated by the addresser of the original document, and the transmission operation is conducted in accordance with the CCITT (b1, b2, b6, b7). Upon completion of the transmission (b8), the transmission unit 12 of the addresser transmits to the addressee the EOM (b9) and the DTC (b10). The receipt of the EOM and the DTC is then posted to the mode conversion unit 27. The unit 27 directs the reception unit 13 to receive the response and directs the line connection unit 16 to connect the reception unit 13 to the communication line 18 as well as disconnects the transmission unit 12 therefrom. Receiving the DTC (b11) and further the response from the addressee in accordance with the direction of the mode conversion unit 27, the reception unit 13 transmits the DTC and the response to the output unit 14 (b12). Then the EOM is transmitted so that the addresser is notified that the transmission of the response is completed (b13). Upon receipt of the response, the addresser transmits the MCF (b14). Then the communication line is disconnected so that the transmission/receiving operation is terminated (b5, a5).

(Embodiment 2)

A second embodiment of the present invention will be described hereunder, in which like components are labeled with like reference numerals with respect to the first embodiment, and the description of these components will not be repeated. The second embodiment differs from the first embodiment in the function of the response generation unit 22, and this will be described in detail hereinafter.

Figure 6:
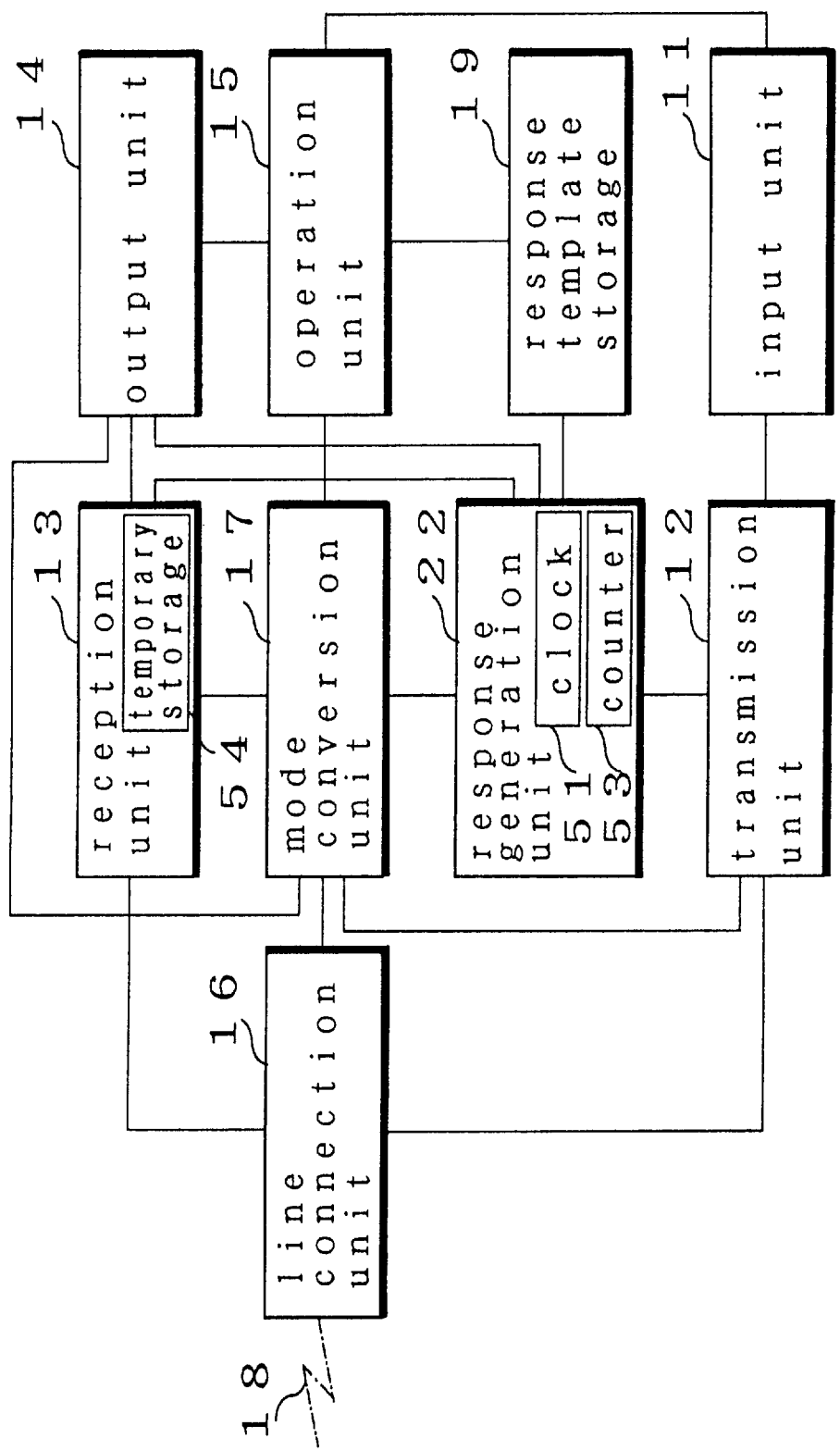
FIG. 6 shows construction of the facsimile apparatus employed in another embodiment of the present invention.

As shown in FIG. 6, the facsimile apparatus in this embodiment comprises the input unit 11, the transmission unit 12, the reception unit 13, the output unit 14, the operation unit 15, the line connection unit 16, the mode conversion unit 17, the communication line 18, and the response template storage 19 besides the response generation unit 22. The response generation unit 22 is comprised of a courter 53 and the clock 51 for providing a receipt number to the original document as well as a transmission number to the response. The response generation unit 22 generates a first draft for the response by writing a value of the clock 51 and a counting number of the counter 53 into the template, which is the same as the generation of the response in the first embodiment except that the counter 53 increases its value by one upon each transmission of the response (the counter 52 in the first embodiment indicates the number of pages contained in the document). Then, the unit 22 generates the final draft for the response by combining the first draft and the information included in the original document, to be transmitted by the transmission unit 12.

The original document to be responded may be an application form generated for a specific purpose. For example, an application form in FIG. 7 is generated for use of the mail order. As shown in the figure, the application form has two columns: one for customer use and the other for store use. Further, every corner of the application form as well as every line of the column for store use are marked so that the data are read therefrom correctly. Thus, the marks on each application form as well as the EOL and the MPS are employed by the response generation unit 22 in its generation of response to the application form.

Figure 8:
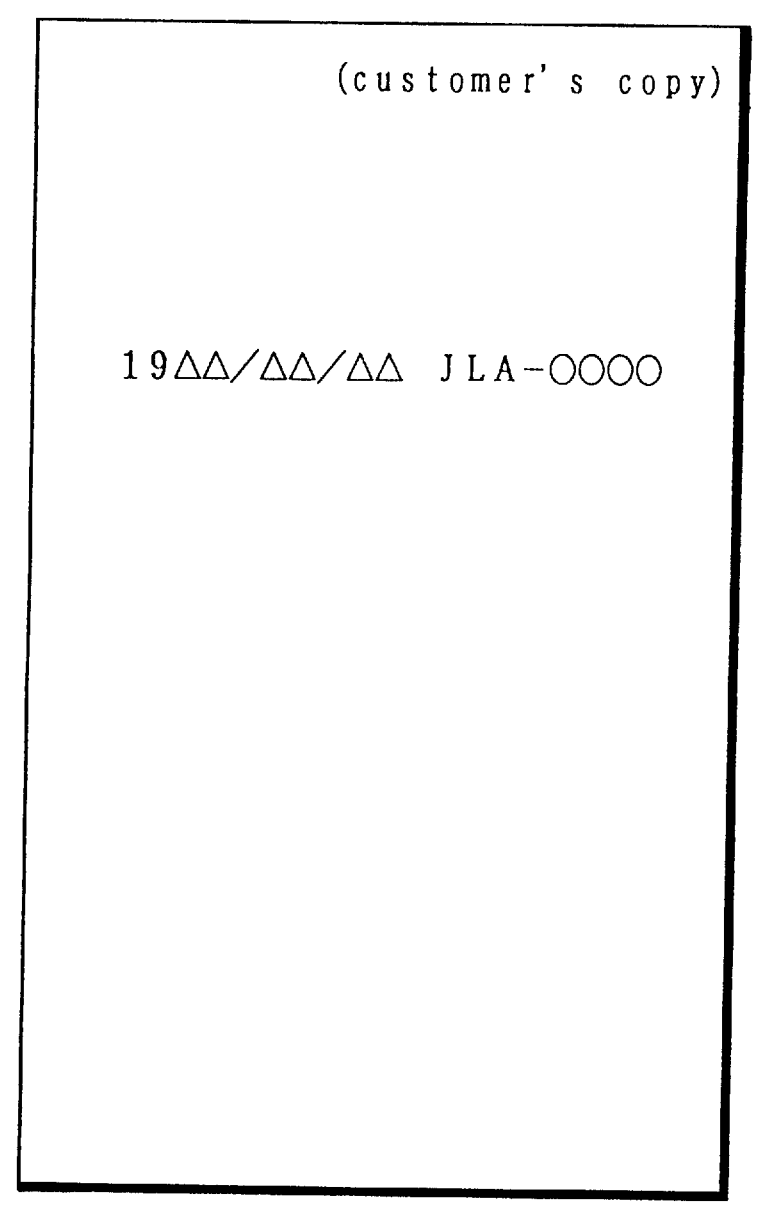

A template employed to generate a response to the application form is shown in FIG. 8. The template is generated in accordance with the application form in FIG. 7. That is, the data are read from the application form by the facsimile apparatus installed in the store, and the column for store use are filled with the information (the receipt date and the receipt number in this case) referring to the template. FIG. 9 shows the application form fully filled out by the customer except for the column designed for store use. On receiving the application form, the receipt unit 13 of the facsimile apparatus terminal holds it into a temporary storage 54 which is accommodated inside itself. Upon completion of the reception, the response generation unit 22 generates the final draft for the response by combining the data read from the received application form and the first draft for the response, in accordance with the direction of the mode conversion unit 17. Then the final draft for the response, which is shown in FIG. 10, is transmitted from the transmission unit 12 to the facsimile apparatus on the other terminal, that is the customer in this case. Also according to the direction of the mode conversion unit 17, the final draft for the response is sent to the output unit 14 so that the printing of the response on the printing paper will be directed. The application form may not be printed until the response to it is generated. That is, when the application form sent from the customer is not printed, the consumption of printing papers and the waiting time for the response will be controlled low.

The receipt number automatically provided to each application form will be the great advantage for the store to simplify their operations as well as prevent the inconveniences that may cause both to the customer and the store. For example, the store will correspond each payment to the application form referring to the receipt number thereon; thereby the store will easily detect which application form has been paid or the like. This may be especially helpful for the store when the customer sends a plurality of application forms at one time (The source of the payment would be identified if a serial number were given to the application form beforehand. However, most of the application forms for the ordinary use are taken out from a weekly magazine or a newspaper and do not carry the serial number).

Figure 11:
FIG. 11 shows a format of another document to be transmitted by the facsimile apparatus in FIG. 6.
Figure 12:
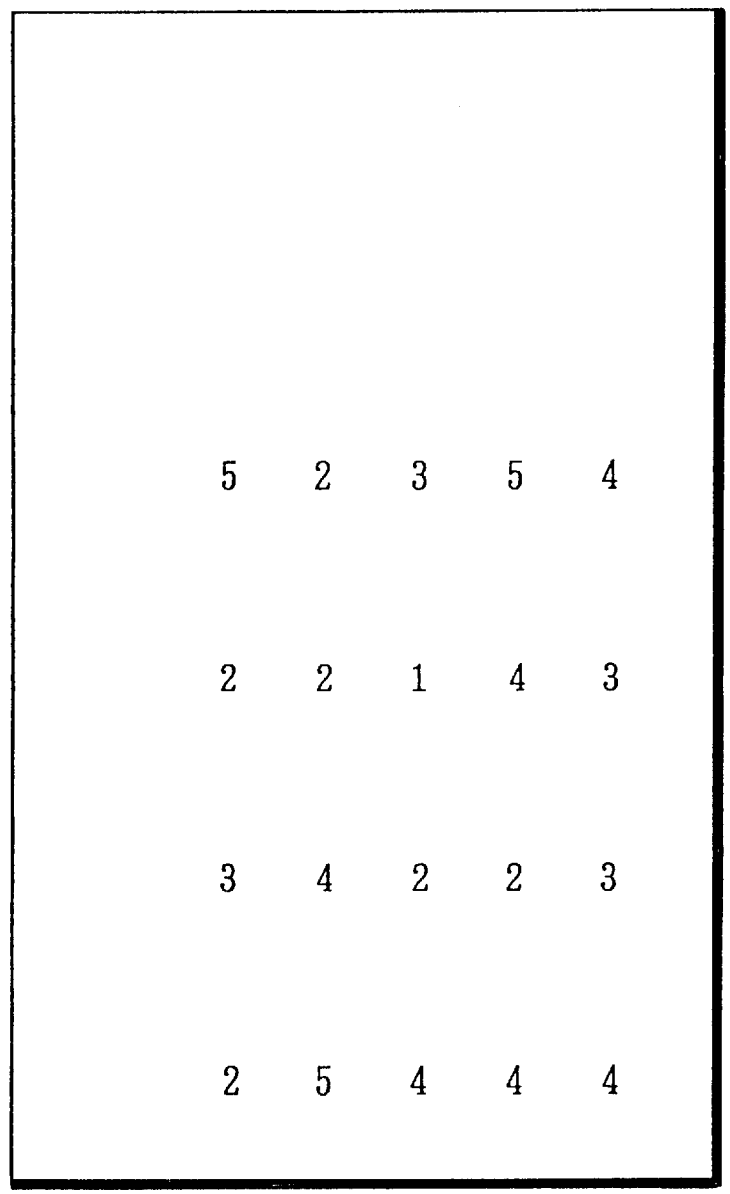
FIG. 12 shows a template for a response to the document illustrated in FIG. 11.
Figure 13:
FIG. 13 shows a document transmitted by the facsimile apparatus in FIG. 6.

The template for the response may not have the receipt date or the receipt number. For example, the correspondence course of education builds the communication line between a student and a teacher for transmission/reception of a collection of questions as well as the answers. In this case the answer sheet transmitted by the student has two columns: one for student use and the other for teacher use; the former to be filled with the student's own answers while the latter to be filled with the correct answers. FIG. 11 shows an example of the answer sheet. As shown in the figure, bar codes are fixed at the upper left hand corner of the sheet so that the sort of the answer sheet is identified. FIG. 12 shows a template for the response. The correct answers are written into the template beforehand. On receiving from the student the answer sheet filled out with their own answers (FIG. 13); the response to the answer sheet is generated by selecting the appropriate template based on the bar codes on the answer sheet, then combining the selected template and the received answer sheet. The generated response shown in FIG. 14 is transmitted to the student. The student will be able to mark the answer sheet himself based on the received response instead of having the teacher mark it, and hence the waiting time for the marked answer sheet will be eliminated.

The bar codes are fixed at the predetermined place of each answer sheet in combination of white and black marks. The sort of the answer sheet is identified by the response generation unit 22 which holds the program for decoding the bar codes. Additionally, positions of the marks and the bar codes on the answer sheet are easily recognized by the unit 22 since size of the answer sheet is determined beforehand.

Thus, the bar codes on the answer sheet will realize a quick identification. However, other symbols such as circles and triangles as well as alphabets and numbers can be employed instead of the bar codes if a decoding device is employed to decode them such as the one decoding ZIP codes in Japan. That decoding device may also mark the student's answers by comparing them to the correct answers. In this case, the program for the marking operation is stored into either the ROM/RAM or the disk of the microcomputer. (Embodiment 3)

A third embodiment of the present invention will be described hereunder, in which like components are labeled with like reference numerals with respect to the first and the second embodiments, and the description of these components will not be repeated. The third embodiment differs from the other embodiments in functions of a response generation unit 23 and a response extract unit 20, and they will be described in detail hereinafter.

Figure 15:
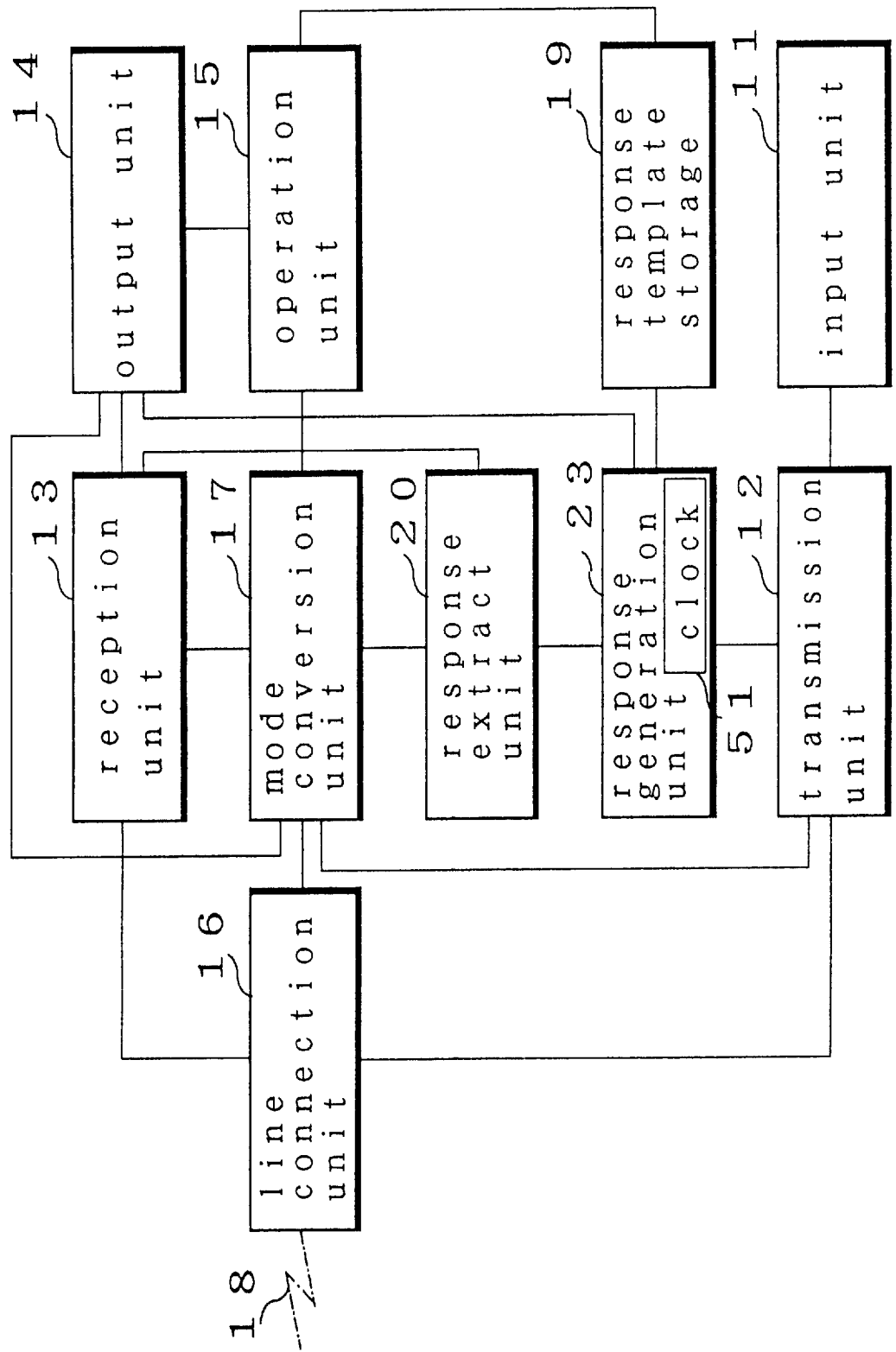
FIG. 15 shows construction of the facsimile apparatus employed in another embodiment of the present invention.
Figure 16:
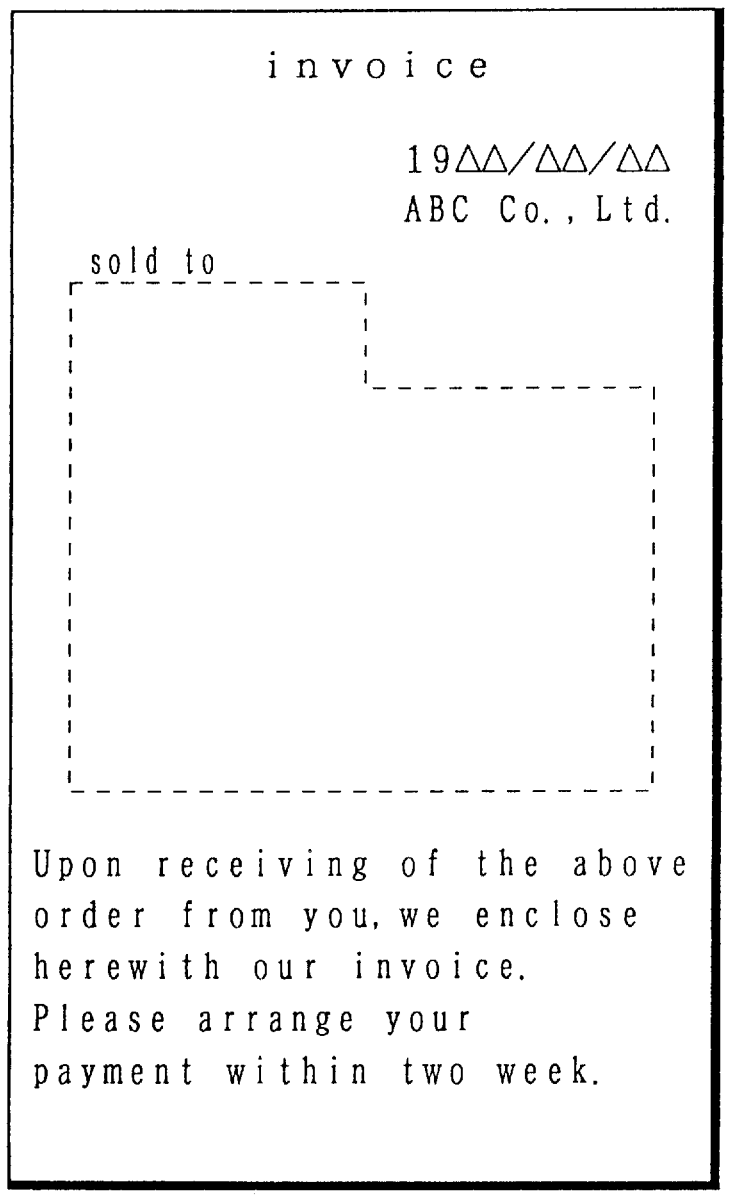
FIG. 16 is a template for a response to the document transmitted by the facsimile apparatus in FIG. 15.
Figure 17:
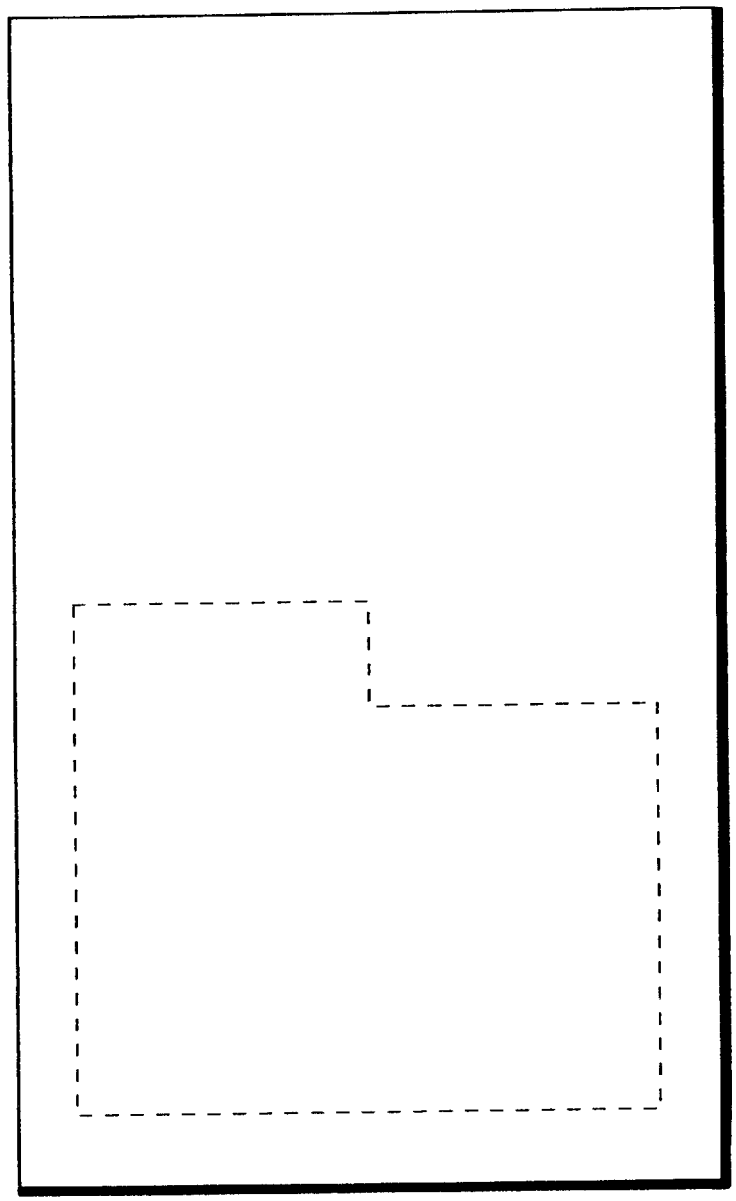
FIG. 17 shows an area of the document to be extracted by the facsimile apparatus in FIG. 15.

FIG. 15 shows construction of the facsimile apparatus in this embodiment. On receiving the document, the response extract unit 20 takes out a predetermined part of the document, and gives it to the response generation unit 23. Then, the unit 23 writes it into a predetermined area of the template, and completes the response based on the template. Thus, the part of the application form can be transferred to the response, thereby the automatic transmission of the response such as the bill for the received application form will be realized. For example, a template in FIG. 16 is generated to respond to the application form in FIG. 6. In this case, part of the application form enclosed with a dotted line in FIG. 17 will be taken out by the response exact unit 20. On receiving the application form, a response in FIG. 18 is generated based on the templates in FIGS. 16 and 17 as well as the received application form; then the response is automatically transmitted to the customer. Consequently, the operations of the conventional apparatus following the receipt of the application form up to the transmission of the response will be eliminated.

Modification of the above embodiment will be described hereinafter.

(1) The message of the template may be copied from the original document although it is inputted to the response template storage 19 by the word processor associated with the input unit in the first embodiment.

(2) The addresser of the original document may select the sort of the response by transmitting to the addressee one of DTMFs (Dual tone multi frequency signals) by buttons of the phone such as #1* or #2*; although the addressee selects it upon the receipt of the original document in the above embodiments.

(3) The facsimile apparatuses in the above embodiments may conduct the operations of the conventional facsimile apparatus when necessarily.

(4) The conventional facsimile apparatus may be modified to be the apparatus of the present invention.

Communication fee may be charged to an addressee if the strategy disclosed in Japanese Laid-Open Patent Application No. 63-22066, No. 1-106670 and No. 1-286566 is employed.

Further, in the embodiments 2 and 3 the identification number of the addressee may be written into the format of the document. Utilizing that format, the communication line will be connected correctly since the possibility of inputting the wrong identification number is eliminated.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. A facsimile apparatus comprising:

a receiving unit for receiving a set of image data transmitted by a transmission side facsimile apparatus through a communication line, wherein the receiving unit includes at least a demodulator for expanding and demodulating the set of image data;

a counter for increasing a count value and generating a number corresponding to an increased count value every time a set of image data is received;

a response generator for generating a set of response data by writing the number generated by the counter into the received set of image data for which the number was generated; and a transmitting unit for transmitting the set of response data back to the transmission side facsimile apparatus.

2. The facsimile apparatus of claim 1 further comprising output means for printing the set of response data on paper after the set of response data is transmitted.

3. The facsimile apparatus of claim 2, wherein the output means only prints the received set of image data on paper when requested by a user.

4. The facsimile apparatus of claim 1 further comprising a storage unit for storing the received set of image data.

5. The facsimile apparatus of claim 1, wherein a position of the number on a response data is fixed in a predetermined format.

6. A facsimile apparatus comprising:

a receiving unit for receiving a set of image data transmitted by a transmission side facsimile apparatus through a communication line, wherein the receiving unit includes at least a demodulator for expanding and demodulating the set of image data;

a data identifier for identifying the received set of image data by detecting an identification signal marked at a predetermined place on it or a communication protocol;

a counter for increasing a count value every time a set of image data is received;

an alphabet number generator for generating a set of alphabet number data composed of a combination of an alphabet corresponding to a set of image data identified by the data identifier and a number corresponding to a current count value of the counter;

a response generator for generating a set of response data by writing the alphabet number generated by the alphabet number generating means into the received set of image data for which the alphabet number was generated; and a transmitting unit for transmitting the set of response data back to the transmission side facsimile apparatus.

7. The facsimile apparatus of claim 6 further comprising output means for printing the set of response data on paper after the set of response data is transmitted.

8. The facsimile apparatus of claim 7, wherein the output means only prints the received set of image data on paper when requested by the user.

9. The facsimile apparatus of claim 6 further comprising a storage unit for storing the received set of image data.

10. The facsimile apparatus of claim 6, wherein a position of the alphabet number on a response data is fixed in a predetermined format.

11. The facsimile apparatus of claim 6, wherein the received set of image data is an application form and the alphabet number is a receipt number.

12. The facsimile apparatus of claim 6, wherein the identification signal is composed of at least one of:

(a) bar codes,
(b) geometric symbols,
(c) alphabet characters, and
(d) numbers.

13. An image processing apparatus comprising:

a reception unit for receiving a set of image data;

a counter for increasing a count value and generating a number corresponding to an increased count value every time a set of image data is received;

a response generator for generating a set of response data by writing the number generated by the counter onto the received set of image data for which the number was generated; and a return unit for returning a generated set of response data.

14. The image processing apparatus of claim 13 further comprising output means for printing the set of response data on paper.

15. The image processing apparatus of claim 14, wherein the output means only prints the received set of image data on paper when requested by the user.

16. The image processing apparatus of claim 13 further comprising a storage unit for storing the received set of image data.

17. The image processing apparatus of claim 13, wherein a position of the number on a response document is fixed in a predetermined format.

18. An image processing apparatus comprising:

a receiving unit for receiving a set of image data;

a data identifier for identifying the received set of image data by detecting an identification signal marked at a predetermined place on it or a communication protocol;

a counter for increasing a count value every time a set of image data is received;

an alphabet number generator for generating a set of alphabet number data composed of a combination of an alphabet corresponding to a set of image data identified by the data identifier and a number corresponding to a current count value of the counter;

a response generator for generating a set of response data by writing the alphabet number generated by the alphabet number generator onto the received set of image data for which the alphabet number was generated; and a return unit for returning a generated set of response data.

19. The image processing apparatus of claim 18 further comprising output means for printing the set of response data on paper.

20. The image processing apparatus of claim 19, wherein the output means only prints the received set of image data on paper when requested by the user.

21. The image processing apparatus of claim 18 further comprising a storage unit for storing the received set or image data.

22. The image processing apparatus of claim 18, wherein a position of the alphabet number on a response document is fixed in a predetermined format.

23. The image processing apparatus of claim 18, wherein the received set of image data is an application form and the alphabet number is a receipt number.

24. The image processing apparatus of claim 18, wherein the identification signal is composed of at least one of:

(a) bar codes,
(b) geometric symbols,
(c) alphabet characters, and
(d) numbers.

* * * * *